United States Patent
Allan et al.

(10) Patent No.: US 12,036,991 B2
(45) Date of Patent: Jul. 16, 2024

(54) CONTROLLING AN AUTONOMOUS VEHICLE BASED UPON COMPUTED LANE BOUNDARIES

(71) Applicant: GM GLOBAL TECHNOLOGY OPERATIONS LLC, Detroit, MI (US)

(72) Inventors: Jeremy Allan, Menlo Park, CA (US); Daniel Chen, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 117 days.

(21) Appl. No.: 17/039,943

(22) Filed: Sep. 30, 2020

(65) Prior Publication Data

US 2021/0016780 A1     Jan. 21, 2021

Related U.S. Application Data

(63) Continuation of application No. 16/052,750, filed on Aug. 2, 2018, now Pat. No. 10,829,121.

(51) Int. Cl.
| | |
|---|---|
| *B60W 10/20* | (2006.01) |
| *B60W 30/18* | (2012.01) |
| *G05D 1/00* | (2006.01) |
| *B60W 10/06* | (2006.01) |
| *B60W 10/18* | (2012.01) |

(52) U.S. Cl.
CPC ..... *B60W 30/18163* (2013.01); *G05D 1/0212* (2013.01); *B60W 10/06* (2013.01); *B60W 10/18* (2013.01); *B60W 10/20* (2013.01); *B60W 2420/403* (2013.01); *B60W 2420/408* (2024.01); *B60W 2552/00* (2020.02); *G05D 1/0088* (2013.01)

(58) Field of Classification Search
CPC ....... B60W 30/18163; B60W 2552/00; B60W 10/06; B60W 10/18; B60W 10/20; B60W 2420/42; B60W 2420/52; G05D 1/0212; G05D 1/0088
USPC .......................................................... 701/25
See application file for complete search history.

(56) References Cited

U.S. PATENT DOCUMENTS

| | | |
|---|---|---|
| 2018/0051996 A1 | 2/2018 | Katsuki et al. |
| 2018/0189578 A1 | 7/2018 | Yang et al. |
| 2018/0218601 A1 | 8/2018 | Aoki et al. |
| 2018/0273031 A1* | 9/2018 | Fujita ..................... G05D 1/021 |
| 2019/0009782 A1* | 1/2019 | Kanzawa ............... G08G 1/166 |
| 2019/0111922 A1 | 4/2019 | Nath et al. |
| 2019/0146513 A1 | 5/2019 | Tomita et al. |
| 2020/0026284 A1* | 1/2020 | Hiramatsu ............. G01C 21/36 |

OTHER PUBLICATIONS

"Non-Final Office Action for U.S. Appl. No. 16/052,750", dated Oct. 11, 2019, 19 Pages.

(Continued)

*Primary Examiner* — Tiffany P Young

(57) ABSTRACT

Described herein are technologies relating to controlling an autonomous vehicle based upon a computed lane boundary. The computed lane boundary defines a travel path for the autonomous vehicle when the autonomous vehicle turns across a lane of traffic at an intersection of two or more roadways. The autonomous vehicle navigates turn based upon the computed lane boundary, which allows the autonomous vehicle to enter the intersection without crossing into a lane of oncoming traffic.

20 Claims, 9 Drawing Sheets

(56) References Cited

OTHER PUBLICATIONS

"Reply to the Non-Final Office Action for U.S. Appl. No. 16/052,750" Filed Date: Dec. 31, 2019, 18 Pages.
"Supplemental Amendment for U.S. Appl. No. 16/052,750", Filed Date: Jan. 13, 2020, 14 Pages.
"Non-Final Office Action for U.S. Appl. No. 16/052,750", dated Apr. 30, 2020, 5 Pages.
"Reply to the Non-Final Office Action for U.S. Appl. No. 16/052,750", Filed Date: Jun. 30, 2020, 11 Pages.
"Notice of Allowance and Fees Due for U.S. Appl. No. 16/052,750", dated Jul. 30, 2020, 9 Pages.

* cited by examiner

CONTROLLING AN AUTONOMOUS VEHICLE BASED UPON COMPUTED LANE BOUNDARIES

RELATED APPLICATION

This application claims priority to U.S. patent application Ser. No. 16/052,750, filed on Aug. 2, 2018, and entitled "CONTROLLING AN AUTONOMOUS VEHICLE BASED UPON COMPUTED LANE BOUNDARIES", the entirety of which is incorporated herein by reference.

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

It is desirable for an autonomous vehicle to employ driving behaviors that mimic appropriate human driving behaviors, such that the autonomous vehicle acts as expected by passengers of the autonomous vehicle, as expected by other autonomous vehicles, and as expected by human drivers. In some scenarios, however, human driving behavior is somewhat complex, particularly in areas with a significant amount of traffic. For instance, the process of turning across a lane of traffic through an intersection is somewhat complex, as doing so improperly may result in an inability to traverse through the intersection and/or impeding oncoming traffic. These scenarios may be even more problematic for autonomous vehicles, as typically autonomous vehicles rely upon painted lane boundaries to define appropriate travel paths. In many intersections, however, there are no painted lane boundaries for making a turn in an intersection across a lane of traffic.

SUMMARY

The following is a brief summary of subject matter that is described in greater detail herein. This summary is not intended to be limiting as to the scope of the claims.

Described herein are various technologies pertaining to controlling operation of an autonomous vehicle. With more specificity, described herein are various technologies pertaining to controlling operation of the autonomous vehicle as the autonomous vehicle makes a turn across traffic in an intersection (e.g., makes a left turn across traffic or makes a right turn across traffic).

The autonomous vehicle is controlled based upon a computer-implemented map of a geographic region, wherein the map includes two sets of lane boundaries: 1) labeled lane boundaries that represent lane boundaries painted on roadways; and 2) computed lane boundaries that are not representative of lane boundaries painted on roadways. In other words, there are no painted lane boundaries that correspond to the computed lane boundaries. A computed lane boundary is computed such that the computed lane boundary connects two labeled lane boundaries. Therefore, with respect to an intersection of two roadways, a computed lane boundary can define a travel boundary for the autonomous vehicle for when the autonomous vehicle navigates the intersection. The autonomous vehicle can then be controlled to navigate through the intersection (e.g., turn left across a lane of traffic) based upon the computed lane boundary.

In an example, the map referenced above can include a first labeled lane boundary that represents a first painted lane boundary on a first roadway. The map can further include a second labeled lane boundary that represents a second painted lane boundary on a second roadway, wherein the second roadway intersects the first roadway. A computing system can generate a computed lane boundary that defines a travel boundary for the autonomous vehicle when the autonomous vehicle is turning from the first roadway onto the second roadway. In an example, the computed lane boundary can extend linearly from the first labeled lane boundary for a distance, such that the autonomous vehicle, when turning in accordance with the computed lane boundary, is able to enter the intersection of the first roadway and the second roadway without entering a lane of oncoming traffic of the first roadway. Hence, if there is a traffic light at the intersection, the autonomous vehicle is able to enter the intersection while the traffic light is green (and can complete the turn, if necessary, after the traffic light has turned red). The computed lane boundary can be computed based upon a variety of factors, including but not limited to, a width of the intersection, a length of the intersection, a turn radius of the autonomous vehicle, an angle between the first labeled lane boundary and the second labeled lane boundary (when such lane boundaries are extended to intersection with one another), etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
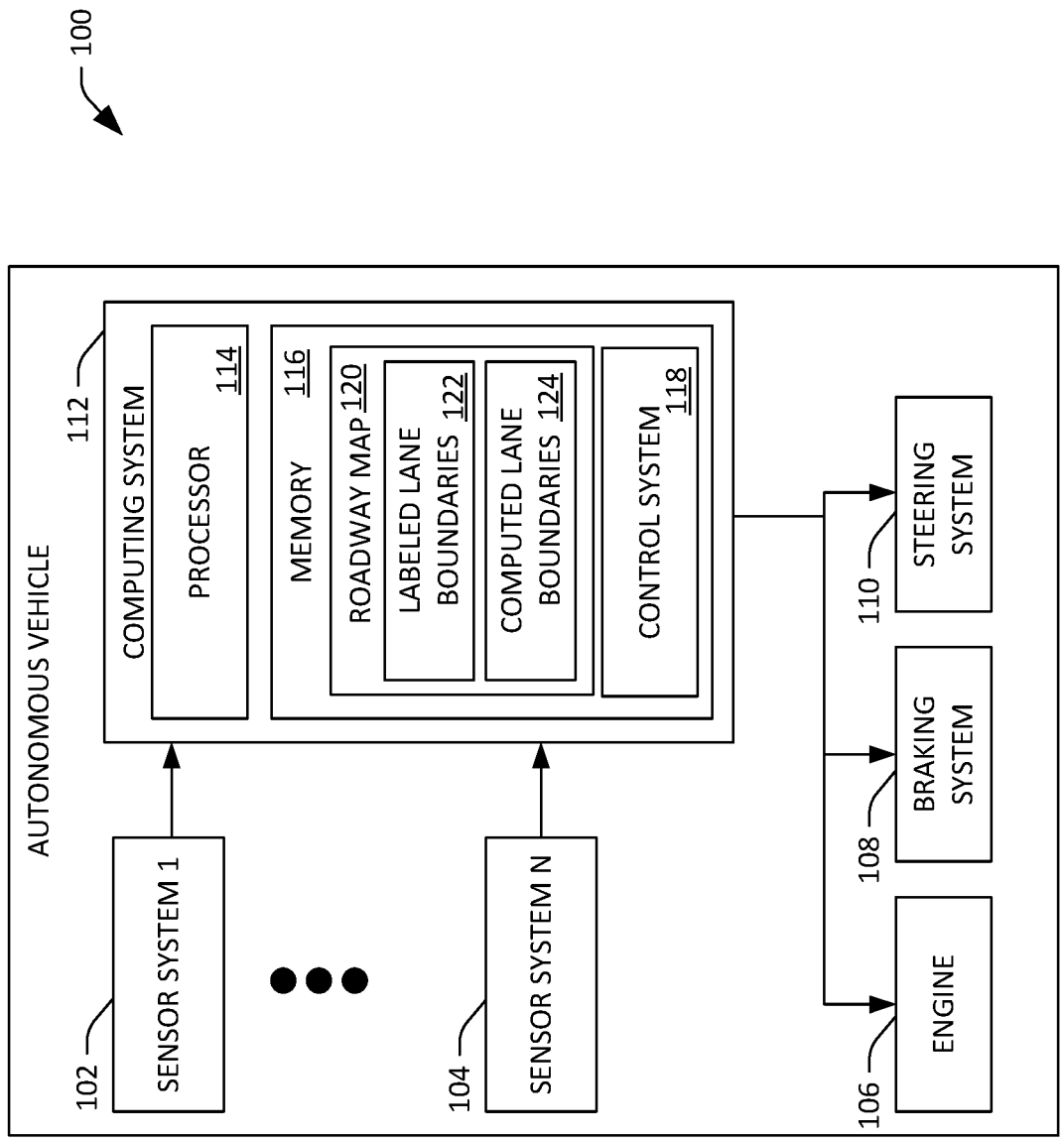
FIG. 1 is a functional block diagram of an exemplary autonomous vehicle.

Various technologies pertaining to controlling an autonomous vehicle based upon computed lane boundaries included in a map are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon: 1) sensor signals output by sensor systems of the autonomous vehicle 100; and 2) a map of the roadways. The autonomous vehicle 100 includes a plurality of sensor systems 102-104 (a first sensor system 102 through an nth sensor system 104). The sensor systems 102-104 are of different types and are arranged about the autonomous vehicle 100. For example, the first sensor system 102 may be a lidar sensor system and the nth sensor system 104 may be a camera (image) system. Other exemplary sensor systems include, but are not limited to, a radar sensor system, a global positioning system (GPS) sensor system, a sonar sensor system, and an infrared sensor system.

The autonomous vehicle 100 additionally comprises several mechanical systems that are used to effectuate appropriate motion of the autonomous vehicle 100. For instance, the mechanical systems can include, but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 100 includes suitable componentry that is configured to control the direction of movement of the autonomous vehicle 100.

The autonomous vehicle 100 further includes a computing system 112 that is in communication with the sensor systems 102-104 and is further in communication with the engine 106, the braking system 108, and the steering system 110. The computing system 112 includes a processor 114 and memory 116, wherein the memory 116 includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a Field Programmable Gate Array (FPGA), or the like.

The memory 116 has a control system 118 loaded therein that is executed by the processor 114. The memory 116 also includes a roadway map 120, wherein the control system 118 is configured to control the engine 106, the braking system 108, and/or the steering system 110 based upon outputs of the sensor systems 102-104 and further based upon the roadway map 120. The roadway map 120 includes representations of a plurality of roadways in a geographic region. To that end, the roadway map 120 includes labeled lane boundaries 122 that correspond to roadways represented in the roadway map 120, wherein the labeled lane boundaries 122 represent painted lane boundaries on roadways in the geographic region.

The roadway map 120 additionally includes computed lane boundaries 124 that are not representative of painted lane boundaries on roadways represented in the roadway map 120. For example, at an intersection of a first roadway and a second roadway, oftentimes there are no painted lane boundaries that identify a travel pathway for a vehicle when the vehicle is to exit a lane of the first roadway and enter a lane of the second roadway. A computed lane boundary in the computed lane boundaries 124 connects a pair of labeled lane boundaries in the labeled lane boundaries 122. Accordingly, the roadway map 120 identifies lane boundaries for use by the autonomous vehicle 100 when traversing over roadways regardless of whether the roadways have lane boundaries painted thereon.

The computed lane boundaries 124 are computed such that the autonomous vehicle 100, when navigating an intersection of roadways, travels through the intersection in a manner that mimics appropriate human driving behavior. More specifically, the control system 118 controls at least one of the mechanical systems of the autonomous vehicle 100 such that the autonomous vehicle 100 enters an intersection of a first roadway and a second roadway when the travel path of the autonomous vehicle 100 involves exiting the first roadway and entering the second roadway (while crossing at least one lane of traffic of the first roadway). This ensures, for example, that the autonomous vehicle 100 does not wait indefinitely at a traffic light at an intersection of two roadways.

As indicated previously, a computed lane boundary in the computed lane boundaries 124 connects a pair of labeled lane boundaries in the labeled lane boundaries 122. With more specificity, the labeled lane boundaries 122 can include a first labeled lane boundary that represents a first painted lane boundary of a first roadway. The labeled lane boundaries 122 can further include a second labeled lane boundary that represents a second painted lane boundary of a second roadway that intersects the first roadway. The computed lane boundaries 124 therefore include a computed lane boundary that connects the first labeled lane boundary with the second labeled lane boundary, wherein the first labeled lane boundary, the second labeled lane boundary, and the computed lane boundary act as travel boundaries for the autonomous vehicle 100. Effectively, then, the computed lane boundary can be extended onto the roadway through the intersection of the first roadway and the second roadway, and the control system 118 can control the autonomous vehicle 100 such that the autonomous vehicle 100 considers the projected lane boundary when maneuvering over roadways. In such an example, the computed lane boundary can be computed based upon a variety of factors including, but not limited to, a turn radius of the autonomous vehicle 100, an interior angle between the first lane boundary and the second labeled lane boundary when such lane boundaries are extended to intersect with one another, a width of the intersection, and/or a length of the intersection. Additional detail pertaining to computation of a computed lane boundary is set forth below.

Figure 2:
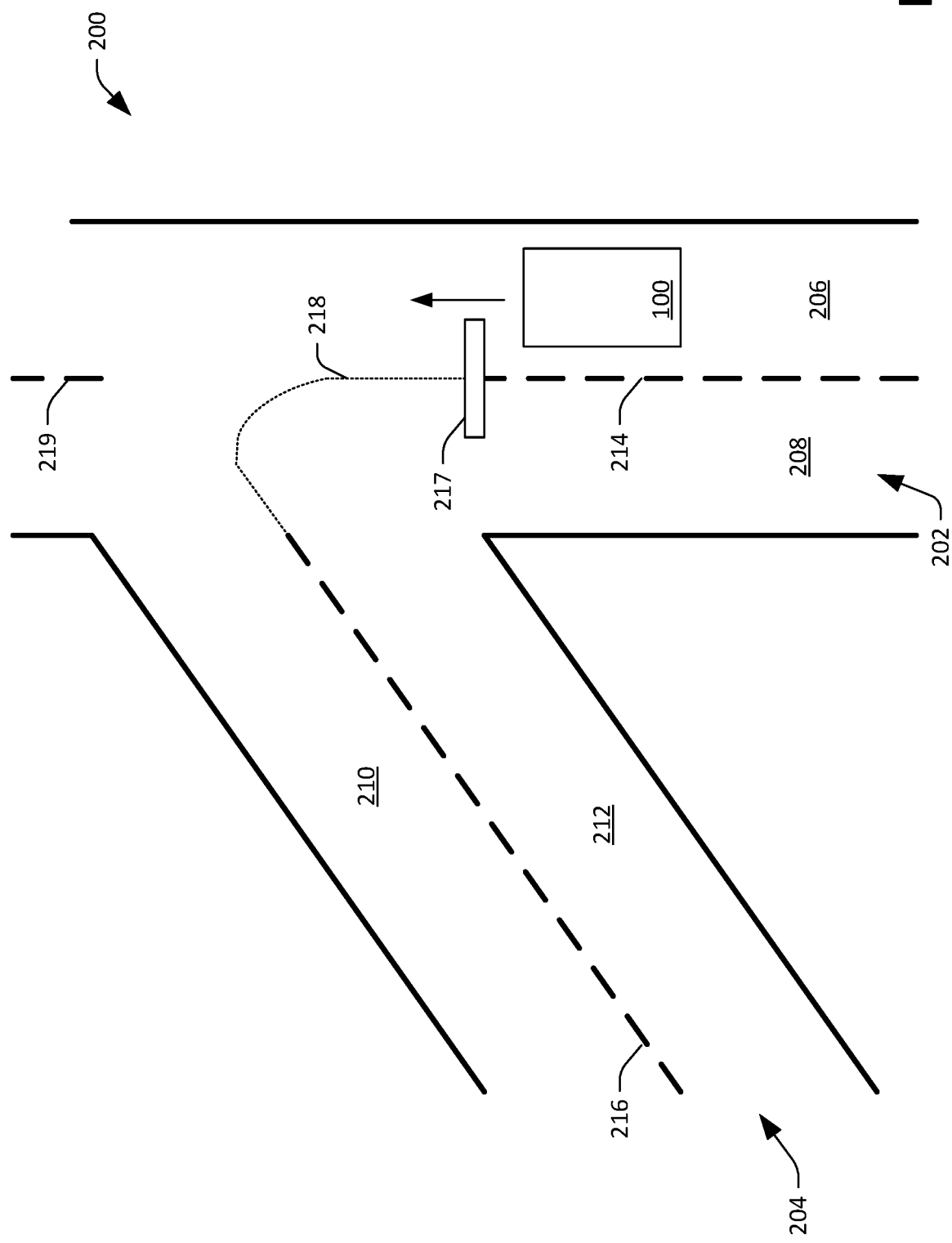
FIGS. 2-5 illustrate an autonomous vehicle turning left through an intersection in accordance with a computed lane boundary.

Now referring to FIG. 2, a geographic region 200 that can be represented in the roadway map 120 is illustrated. The geographic region 200 includes a first roadway 202 and a second roadway 204. The first roadway 202 includes a first lane 206 within which vehicles travel in a first direction. The first roadway 202 also includes a second lane 208 within which vehicles travel in a second direction that is opposite the first direction. The second roadway 204 includes a third lane 210 within which vehicles travel in a third direction. The second roadway 204 also includes a fourth lane 212 within which vehicles travel in a fourth direction that is opposite the third direction. As shown in FIG. 2, the first roadway 202 and the second roadway 204 meet at an intersection of roadways.

The roadways 202 and 204 include several painted lane boundaries (which are represented in the roadway map 120 as labeled lane boundaries). More specifically, the first roadway 202 includes a first painted lane boundary 214 (which is represented by a first labeled lane boundary in the labeled lane boundaries 122), and the second roadway 204 includes a second painted lane boundary 216 (which is represented by a second labeled lane boundary in the labeled lane boundaries 122). A stop line 217 is positioned in the first roadway 202 at an entrance of the intersection of the first roadway 202 and the second roadway 204, wherein the stop line 217 identifies where vehicles travelling in the first lane are to stop at a stop sign or traffic light of the intersection. A third painted lane boundary 219 defines a lane boundary for oncoming traffic.

The autonomous vehicle 100 is illustrated in FIG. 2 as being in the first lane 206 of the first roadway 202 traveling in the first direction towards the intersection of the first roadway 202 and the second roadway 204, wherein the autonomous vehicle 100 is to enter the intersection only when the autonomous vehicle 100 is authorized to do so (e.g., when a stop light corresponding to the stop line 217 is green). A dashed line 218 represents a travel boundary for the autonomous vehicle 100 for when the autonomous vehicle 100 exits the first lane 206 of the first roadway 202 and enters the third lane to 210 of the second roadway 204 (i.e., for when the autonomous vehicle 100 turns left through the intersection). The dashed line 218 represents a computed lane boundary in the computed lane boundaries 124 of the roadway map 120. Put differently, the dashed line 218 is a projection of the computed lane boundary through the intersection of the first roadway 202 and the second roadway 204.

It is to be noted that the dashed line 218 does not immediately curve from the first painted lane boundary 214 to the second painted lane boundary 216. If this were the case, the autonomous vehicle 100 may be unable to enter the intersection of the first roadway 202 and the second roadway 204 when one or more vehicles are traveling in the second lane 208 of the first roadway 202 in the second direction (e.g., the autonomous vehicle 100 would immediately enter the second lane 208, and impede traffic flowing in the second direction). Therefore, if the first roadway 202 were a relatively busy street, a traffic light corresponding to the stop line 217 may cycle through several times before the autonomous vehicle 100 is able to exit the first lane 206 of the first roadway 202 and enter the third lane 210 of the second roadway 204 (and cross the second lane 208 of the first roadway 202). Thus, instead of immediately curving from the first painted lane boundary 214 to the second lane boundary 116, the dashed line 218 extends linearly from the first painted lane boundary 214. Therefore, the autonomous vehicle 100 can adhere to the travel boundary represented by the dashed line 218 and enter the intersection without crossing into the second lane 208 of the first roadway 202. Accordingly, when the computed lane boundary (represented by the dashed line 218) is computed, the computed lane boundary can extend linearly from a labeled lane boundary that represents the first painted lane boundary 214.

Figure 3:
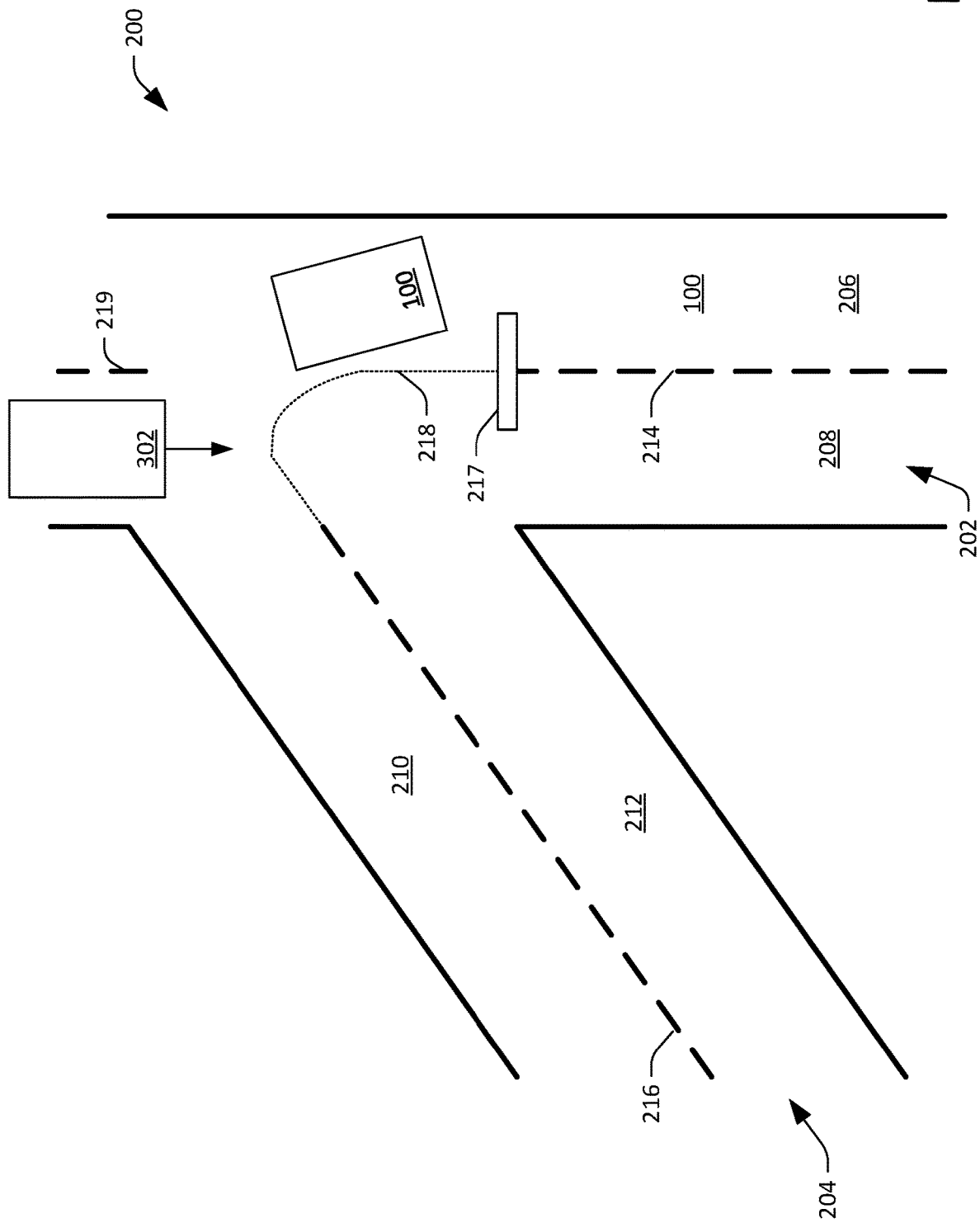

Now referring to FIG. 3, the geographic region 200 is illustrated and operation of the autonomous vehicle 100 when making a left turn through the intersection of the first roadway 202 and the second roadway 204 is depicted. In this example, the traffic light corresponding to the stop line 217 has indicated that the autonomous vehicle 100 is able to move forward and into the intersection. A second vehicle 302 is on the opposite side of the intersection on the first roadway 202 and traveling in the second lane 208 in the second direction (through the intersection and continuing along the first roadway 202). The control system 118, based upon output of the sensor systems 102-104 and the roadway map 120, determines that the second vehicle 302 is in the second lane 208 of the first roadway 202, and further continuously determines the location of the autonomous vehicle 100 relative to the dashed line 218. The control system 118 causes the autonomous vehicle 100 to move forward (past the stop line 217 and into the intersection) and to the left in accordance with the computed lane boundary. The control system 118, however, controls the autonomous vehicle 100 such that the autonomous vehicle 100 does not enter the second lane 208, due to the second vehicle 302 being detected as traveling through the intersection in the second lane 208. In other words, the control system 118 ensures that the autonomous vehicle 100 does not impede traffic in the second lane 208 of the first roadway 202.

Figure 4:
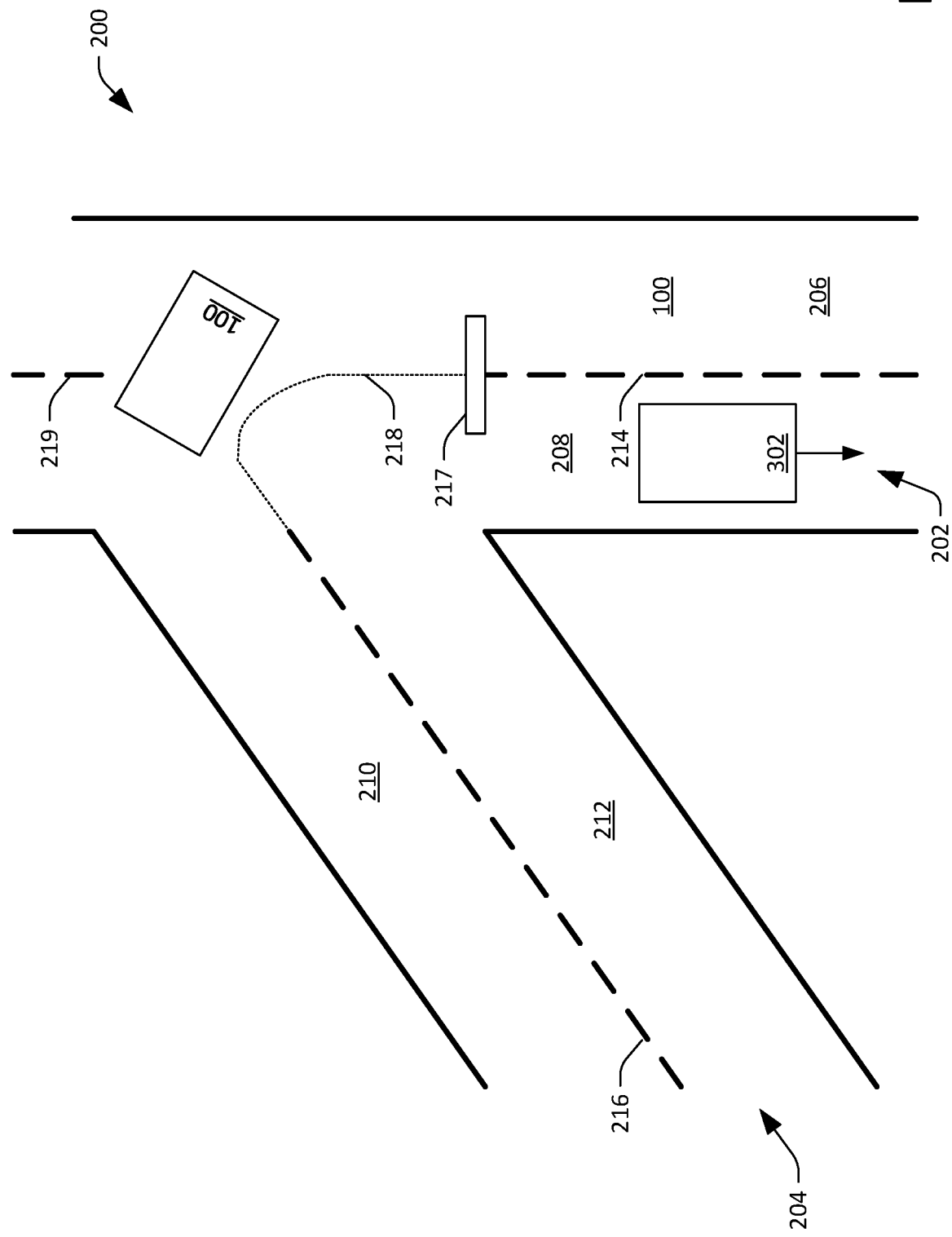
Figure 5:
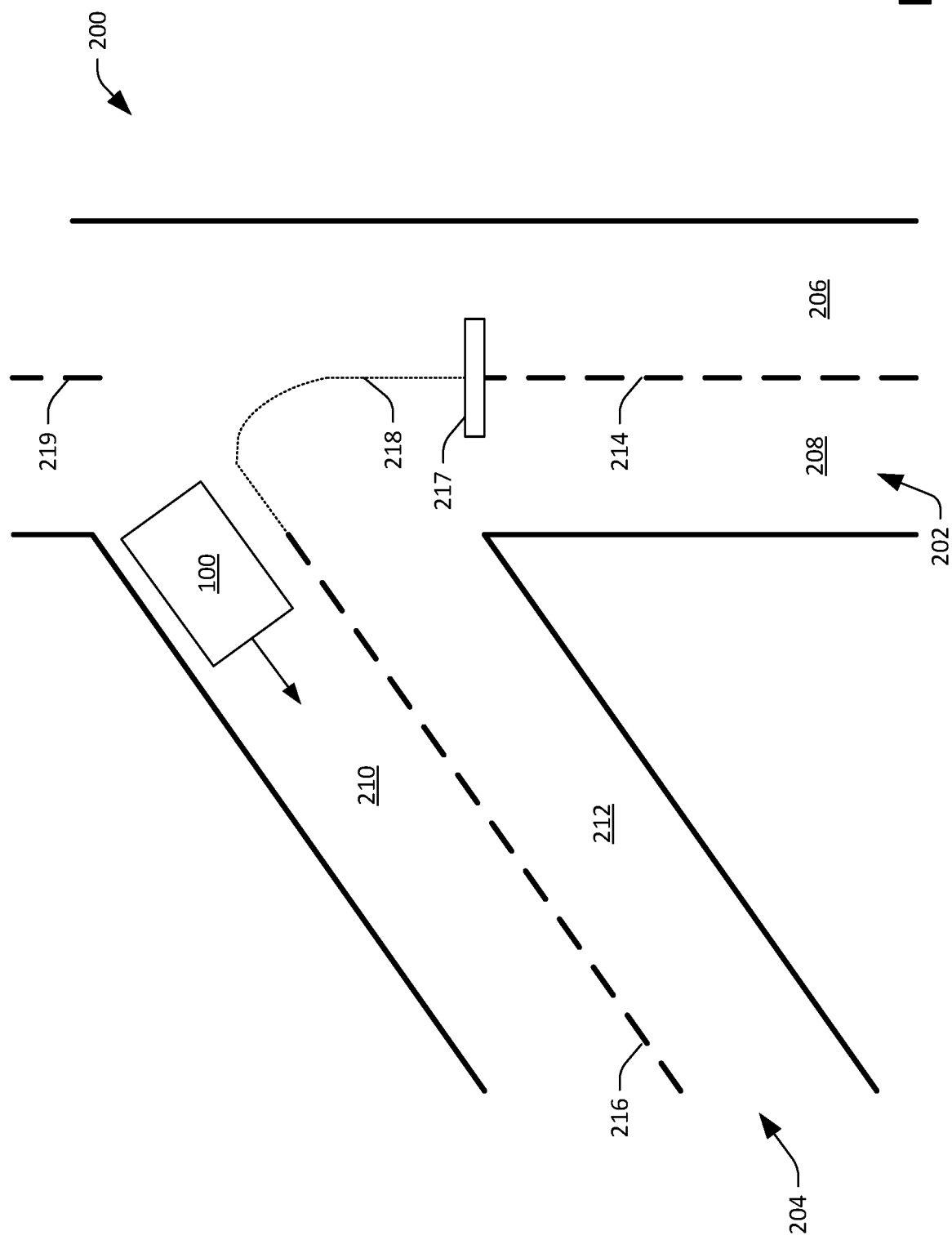

Nevertheless, the control system 118 causes the autonomous vehicle 100 to enter the intersection (past the stop line 217) such that when, for example, the traffic light corresponding to the stop line 217 indicates that vehicles are no longer authorized to enter the intersection (e.g., the traffic light turns red), the autonomous vehicle 100 is able to complete the left turn by crossing the second lane 208 of the first roadway 202 and thereby enter the third lane 210 of the second roadway 204. FIGS. 4 and 5 illustrate the autonomous vehicle 100 completing this turn.

While FIGS. 2-5 illustrate the autonomous vehicle 100 making a left-hand turn through an intersection while keeping in a right lane (in the direction of travel of the autonomous vehicle 100), it is to be understood that in some regions, vehicles travel in a left lane (in a direction of travel). Accordingly, the roadway map 120 can include computed lane boundaries that define travel boundaries for when the autonomous vehicle 100 turns right through an intersection while keeping in a left lane.

Figure 6:
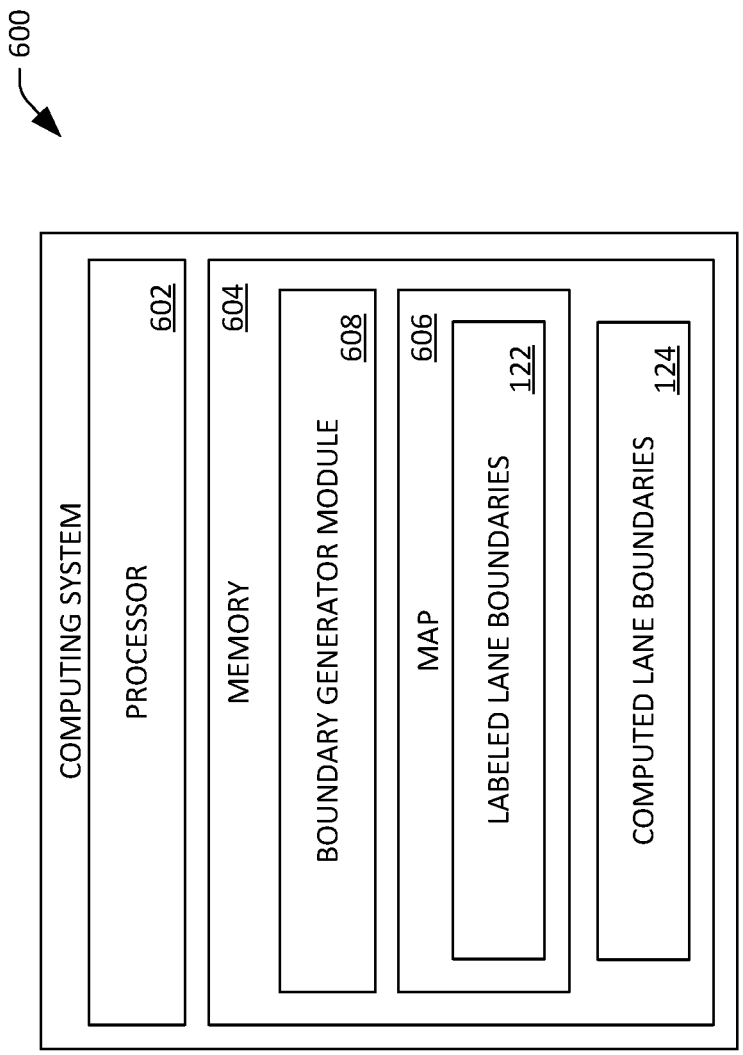
FIG. 6 illustrates an exemplary computing system that is configured to generate computed lane boundary.

Now referring to FIG. 6, an exemplary computing system 600 is illustrated, wherein the computing system 600 is configured to compute the computed lane boundaries 124 of the roadway map 120. The computing system 600 includes a processor 602 and memory 604, wherein the memory 604 has a computer-implemented map 606 loaded therein. The computer-implemented map 606 includes the labeled lane boundaries 122 (which are representative of painted lane boundaries on roadways).

The memory 604 also includes a boundary generator module 608 that is configured to identify roadway intersections in the map 606 and is further configured to compute computed lane boundaries based upon labeled lane boundaries for such intersections. In an example, the labeled lane boundaries 122 include a first labeled lane boundary that represents the first painted lane boundary 214, and the labeled lane boundaries 122 also include the second labeled lane boundary that represents the second painted lane boundary 216. The boundary generator module 608 determines that the map 606 indicates that the first roadway 202 and the second roadway 204 intersect, and that a computed lane boundary is to couple the first labeled lane boundary with the second labeled lane boundary. The boundary generator module 608 can then compute the computed lane boundary (represented by the dashed line 218) based upon one or more factors, which can include, but are not limited to, a turn radius of the autonomous vehicle 100, a minimum velocity of the autonomous vehicle 100 when exiting the first lane 206 and entering the third lane 210, a maximum velocity of the autonomous vehicle 100 when exiting the first lane 206 and entering the third lane 210, an indication as to whether an interior angle between the first labeled lane boundary and the second labeled lane boundary (when such lane boundaries are extended) is acute or obtuse, a value of such interior angle, a length of the intersection, a width of the intersection, and the like.

With more specificity, the boundary generator module 608 can draw each computed lane boundary in two sections: 1) a straightened section that extends from a painted lane boundary of a lane that autonomous vehicles will be exiting (e.g., the first painted lane boundary 214 of the first lane 206); and 2) a curved section that couples the straightened section to a painted lane boundary of a lane that autonomous vehicles will be entering (e.g., the second painted lane boundary 216 of the third lane 210). For example, the boundary generator module 608 identifies that a computed lane boundary is to couple the first painted lane boundary 214 and the second painted lane boundary 216 for the travel direction of the autonomous vehicle 100 as shown in FIGS. 2-5. The boundary generator module 608 draws the straightened section of the boundary, wherein the boundary generator module 608 draws the straightened section by computing a minor Bezier curve (or other smooth curve) for the straightened section that begins where the first painted lane boundary 214 ceases and ends at an end point, thereby smoothing the transition as autonomous vehicles begin to exit the first lane 206. The boundary generator module 608 then draws the curved section, where the curved section couples the end point of the straightened section to the point where the second painted lane boundary 216 ceases. The boundary generator module 608 uses another Bezier curve (or other smooth curve) between the straightened section and the second painted lane boundary 216 to complete the connection between the lanes 206 and 210 in a smooth manner.

The boundary generator module 608, in connection with computing a length of the straightened section, computes an angle of intersection between a first vector that is extended from the first painted lane boundary 214 and a second vector that is extended from the second painted lane boundary 216. In addition to this angle of intersection, the length of the projection of the vector from the last point of 214 and first point of 216 (vector between top-most point of 214 and right-most point of 216) onto the outgoing direction vector of 214 is used to determine how long the straightened section of the lane should be. The boundary generator module 608 additionally determines an angle between the straightened section and the first vector, such that the autonomous vehicle 100 is able to turn slightly rightward prior to completing the left-hand turn, for example. The boundary generator module 608 determines the angle of the computed lane boundary 218 based upon an angle at which the proposed straightened section is able to be rotated (e.g., to the left in the embodiment shown in FIGS. 2-5) before intersecting a vector that is extended from the lane boundary of the oncoming lane (i.e., a vector that is extended from the third painted lane boundary 219). Responsive to drawing the straightened section, the boundary generator module 608 draws the curved section (using a Bezier curve or other smooth curve) to couple the straightened section to the second painted lane boundary 216, thereby completing the computed lane boundary 218.

The boundary generator module 608 can then update the map 606 to include the computed lane boundary in the map 606 and can further label the computed lane boundary as a computed lane boundary rather than a labeled lane boundary. By labeling the computed lane boundary as a computed lane boundary rather than a labeled lane boundary, the control system 118 can be given some flexibility when controlling the autonomous vehicle 100 when the autonomous vehicle 100 turns through an intersection as illustrated in FIGS. 2-5. That is, the control system 118 may control the autonomous vehicle 100 to cross the computed lane boundary when the control system 118 ascertains that there is no traffic on the roadways (thereby allowing the autonomous vehicle 100 to complete the turn more quickly, for example). The boundary generator module 608 can repeat this process for generating computed lane boundaries that correspond to respective labeled lane boundaries in the labeled lane boundaries 122, such that the computed lane boundaries 124 are generated and the map 606 is updated to include the computed lane boundaries 124.

In an exemplary embodiment, the computing system 600 generates the computed lane boundaries 124 off-line, and the autonomous vehicle 100 is updated with the roadway map 120 (e.g., by way of a network connection) after the computed lane boundaries 124 are computed. In other words, the computing system 600 can be a computing system that is separate from (external to) the autonomous vehicle 100. In another exemplary embodiment, the memory 116 of the computing system 112 (of the autonomous vehicle 100) can include the boundary generator module 608, such that the boundary generator module 608 can compute the computed lane boundaries 124 as the autonomous vehicle 100 is in operation. In a nonlimiting example, in such an embodiment, the boundary generator module 608 can generate the computed lane boundaries 124 in real-time based upon observed painted lane boundaries on roadways over which the autonomous vehicle 100 is traveling.

Figure 7:
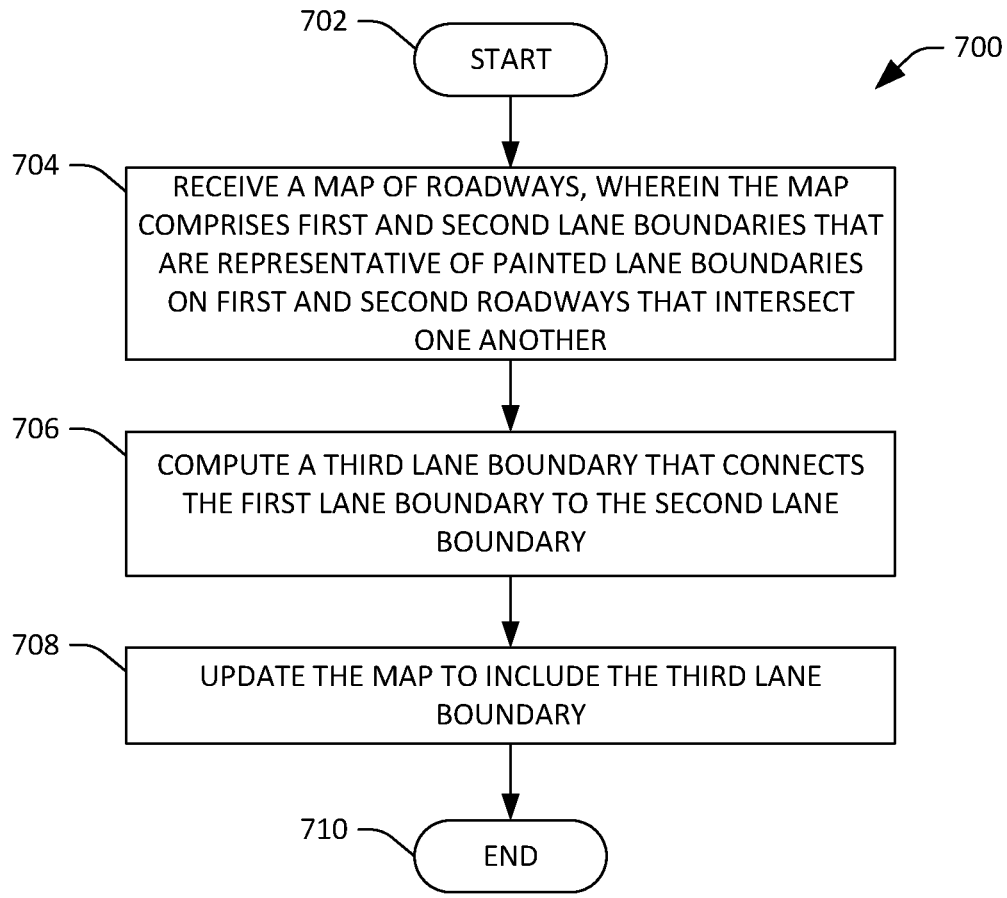
FIG. 7 is a flow diagram illustrating an exemplary methodology for updating a map of a geographic region to include computed lane boundaries.
Figure 8:
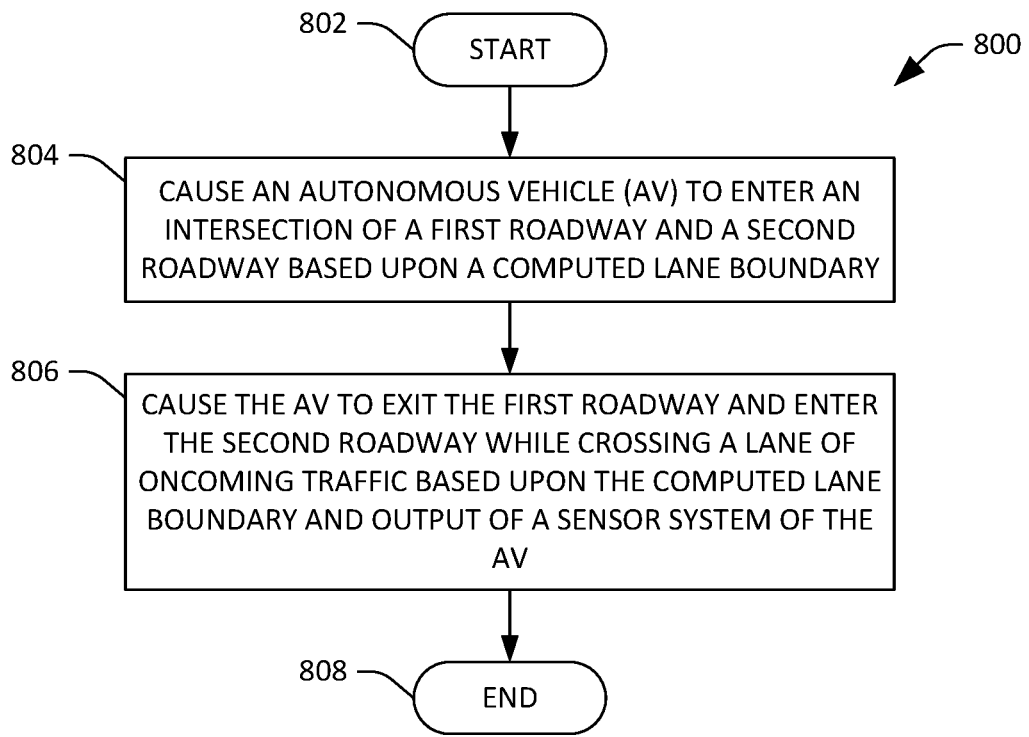
FIG. 8 is a flow diagram illustrating an exemplary methodology for causing an autonomous vehicle to turn across a lane of traffic at an intersection in accordance with a computed lane boundary.

FIGS. 7 and 8 illustrate exemplary methodologies relating to computing lane boundaries and further relating to controlling an autonomous vehicle based upon computed lane boundaries. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 7, an exemplary methodology 700 for generating computed lane boundaries for use by an autonomous vehicle is illustrated. The methodology 700 starts at 702, and at 704 a map of roadways is received, wherein the map of roadways comprises a first lane boundary for a first roadway and a second lane boundary for a second roadway that intersects the first roadway. The first lane boundary represents a first painted lane boundary in the first roadway that separates traffic lanes of the first roadway. The traffic lanes in the first roadway include a first traffic lane for vehicles traveling in a first direction and a second traffic lane for vehicles traveling in a second direction that is opposite the first direction. Similarly, the second lane boundary represents a second painted lane boundary on the second roadway, wherein the second roadway comprises a third lane. Further, when vehicles turn from the first lane of the first roadway to the third lane of the second roadway, the vehicles enter the second lane of the first roadway.

At 706, a third lane boundary that connects the first lane boundary to the second lane boundary is computed, wherein the third lane boundary is computed based upon the first lane boundary and the second lane boundary, and further wherein the third lane boundary is computed such that the third lane boundary extends linearly from the first lane boundary prior to curving to meet the second lane boundary. Accordingly, as discussed above, an autonomous vehicle traveling in accordance with the third (computed) lane boundary will enter the intersection prior to crossing the second lane of the first roadway.

At 708, the map is updated to include the third lane boundary, and an autonomous vehicle is provided with the updated map such that the autonomous vehicle, when exiting the first traffic lane and entering the third traffic lane, crosses the second traffic lane in accordance with the third lane boundary. The methodology 708 completes at 710.

Now referring to FIG. 8, an exemplary methodology 800 that facilitates controlling an autonomous vehicle to traverse through an intersection in accordance with a computed lane boundary is illustrated. The methodology 800 starts at 802, and at 804, at an intersection of a first roadway and a second roadway, the autonomous vehicle is caused to enter the intersection based upon a computed lane boundary. As described previously, the computed lane boundary defines a travel boundary for the autonomous vehicle when the autonomous vehicle is exiting a first lane of the first roadway and entering a second lane of the second roadway, wherein the autonomous vehicle is to cross a third lane of the first roadway when exiting the first lane of the first roadway and entering the second lane of the second roadway, and further wherein the autonomous vehicle fails to enter the third lane of the first roadway when entering the intersection.

At 806, responsive to causing the autonomous vehicle to enter the intersection, the autonomous vehicle is caused to exit the first roadway and enter the second roadway while crossing a lane of oncoming traffic in the first roadway, wherein this is caused based upon the computed lane boundary and output of a sensor system of the autonomous vehicle. The methodology 800 completes at 808.

Figure 9:
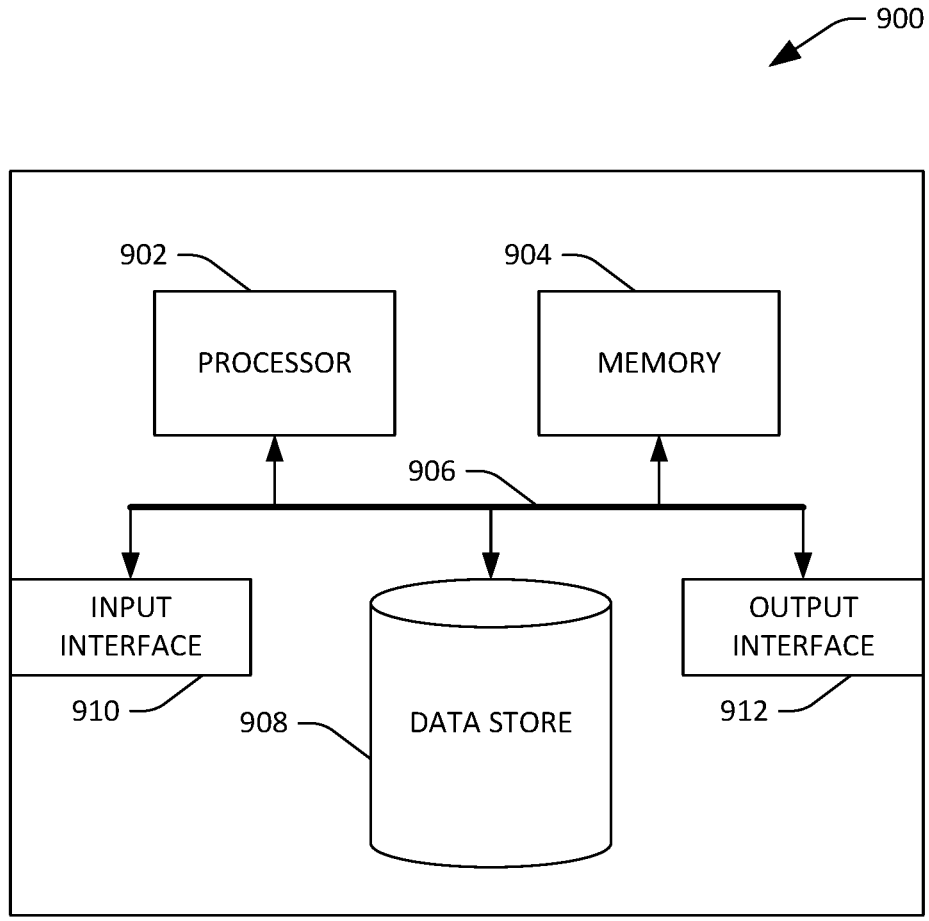
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that is configured to compute lane boundaries for use by an autonomous vehicle. By way of another example, the computing device 900 can be used in a system that is configured to control an autonomous vehicle based upon computed lane boundaries. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a map of a geographic region, sensor data, etc.

The computing device 900 additionally includes a data store 908 that is accessible by the processor 902 by way of the system bus 906. The data store 908 may include executable instructions, a roadway map, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
   a processor; and
   computer-readable storage storing:
      a map employed by the AV to navigate roadways, where the map includes a previously computed lane boundary; and
      instructions that, when executed by the processor, cause the processor to perform acts comprising:
         when the AV is stopped in a first lane of a first roadway at a stop line in the first lane of the first roadway, detecting that a traffic light has changed from red to green, wherein the traffic light is placed at an intersection of the first roadway and a second roadway, first traffic flows in a first direction in the first lane of the first roadway, the AV is to turn at the intersection across a second lane of the first roadway and into the second roadway, and further wherein second traffic flows in a second direction in the second lane of the first roadway, the second direction opposing the first direction;
         subsequent to detecting that the traffic light has changed state from red to green, detecting that a vehicle is travelling towards the AV in the second direction in the second lane of the first roadway;
         while continuing to detect that the vehicle is travelling towards the AV, moving in the first direction and entering the intersection while adhering to a travel boundary that crosses the second lane of the first roadway, wherein the travel boundary is represented by the previously computed lane boundary in the map employed by the AV to navigate roadways, and further wherein the travel boundary linearly extends from a painted lane boundary that defines a boundary between the first lane of the first roadway and the second lane of the first roadway and further linearly extends into the intersection such that the AV enters the intersection without crossing into the second lane of the first roadway;
         detecting, based upon sensors of the AV, that the vehicle has passed through the intersection and the AV is able to turn through the intersection across the second lane of the first roadway and into the second roadway without impeding the second traffic that flows in the second direction; and
         upon detecting that the AV is able to turn through the intersection across the second lane of the first roadway and into the second roadway without impeding the second traffic that flows in the second direction, controlling at least one of a propulsion system or a steering system to cause the AV to turn through the intersection across the second lane of the first roadway and into the second roadway.

2. The AV of claim 1, wherein the intersection is free of an intersection painted lane boundary between the painted lane boundary and another painted lane boundary in the second roadway.

3. The AV of claim 1, the acts further comprising: prior to reaching the stop line and while travelling in the first direction in the first roadway, controlling at least one of the propulsion system, the steering system, or a braking system to adhere to the painted lane boundary.

4. The AV of claim 1, wherein detecting that the AV is able to turn through the intersection across the second lane of the first roadway and into the second roadway without impeding the second traffic that flows in the second direction comprises:
   detecting that the traffic light has transitioned from green to red.

5. The AV of claim 1, wherein the previously computed lane boundary is computed based upon at least one of a width of the intersection, a length of the intersection, or a turn radius of the AV.

6. The AV of claim 1, wherein the sensors comprise a lidar sensor and a camera.

7. The AV of claim 1, where the map includes several previously computed lane boundaries for several intersections.

8. A method performed by an autonomous vehicle (AV), the method comprising:
   autonomously navigating roadways in a region, where autonomously navigating the roadways comprises:
      accessing a computer-implemented map of the region, where the computer-implemented map includes a previously computed lane boundary;
      stopping in a first lane of a first roadway at a stop line in the first lane of the first roadway;
      when the AV is stopped in the first lane of the first roadway at the stop line in the first lane of the first roadway, detecting that a traffic light has changed from red to green, wherein the stop line and the traffic light are for an intersection between the first roadway and a second roadway that intersects the first roadway, first traffic flows in a first direction in the first lane of the first roadway, the AV is to turn at the intersection across a second lane of the first roadway and into the second roadway, and further wherein second traffic flows in a second direction in the second lane of the first roadway, the second direction being opposite the first direction;
      subsequent to detecting that the traffic light has changed from red to green, detecting that a vehicle is travelling towards the AV in the second direction in the second lane of the first roadway;
      while continuing to detect that the vehicle is travelling towards the AV, moving in the first direction and entering the intersection while adhering to a travel boundary that crosses the second lane of the first roadway, wherein the travel boundary is represented by the previously computed lane boundary in the computer-implemented map, and further wherein the travel boundary linearly extends from a painted lane boundary that defines a boundary between the first lane of the first roadway and the second lane of the first roadway such that the AV, while adhering to the travel boundary, enters the intersection without crossing into the second lane of the first roadway;

detecting, based upon sensors of the AV, that the vehicle has passed through the intersection and the AV is able to turn through the intersection across the second lane of the first roadway and into the second roadway without impeding the second traffic that flows in the second direction; and upon detecting that the AV is able to turn through the intersection across the second lane of the first roadway and into the second roadway without impeding the second traffic that flows in the second direction, turning through the intersection across the second lane of the first roadway and into the second roadway.

9. The method of claim 8, wherein the intersection is free of an intersection painted lane boundary between the painted lane boundary and another painted lane boundary in the second roadway.

10. The method of claim 8, further comprising:
prior to reaching the stop line and while travelling in the first direction in the first roadway, controlling at least one of the propulsion system, the steering system, or a braking system to adhere to the painted lane boundary.

11. The method of claim 8, wherein detecting that the AV is able to turn through the intersection across the second lane of the first roadway and into the second roadway without impeding the second traffic that flows in the second direction comprises:
detecting that the traffic light has transitioned from green to red.

12. The method of claim 8, wherein the previously computed lane boundary is computed based upon at least one of a width of the intersection, a length of the intersection, or a turn radius of the AV.

13. The method of claim 8, wherein the sensors comprise a lidar sensor and a camera.

14. The method of claim 8, wherein the computer-implemented map is stored in computer-readable memory of the AV and includes several computed lane boundaries for intersecting roadways.

15. An autonomous vehicle (AV) comprising a computer-readable storage medium, wherein the computer-readable storage medium comprises:
a map employed by the AV to navigate roadways, where the map includes a previously computed lane boundary; and
instructions that, when executed by a processor of the AV, causes the processor to perform acts comprising:
when the AV is stopped in a first lane of a first roadway at a stop line in the first lane of the first roadway, detecting that a traffic light has changed from red to green, wherein the traffic light is placed at an intersection of the first roadway and a second roadway, first traffic flows in a first direction in the first lane of the first roadway, the AV is to turn at the intersection across a second lane of the first roadway and into the second roadway, and further wherein second traffic flows in a second direction in the second lane of the first roadway, the second direction opposing the first direction;

subsequent to detecting that the traffic light has changed from red to green, detecting that a vehicle is travelling towards the AV in the second direction in the second lane of the first roadway;

while continuing to detect that the vehicle is travelling towards the AV, moving in the first direction and entering the intersection while adhering to a travel boundary that crosses the second lane of the first roadway, wherein the travel boundary is represented by the previously computed lane boundary in the computer-readable map that is employed by the AV when autonomously navigating roadways, and further wherein the travel boundary initially linearly extends from a painted lane boundary that defines a boundary between the first lane of the first roadway and the second lane of the first roadway such that the AV enters the intersection without crossing into the second lane of the first roadway;

detecting, based upon sensors of the AV, that the vehicle has passed through the intersection and the AV is able to turn through the intersection across the second lane of the first roadway and into the second roadway without impeding the second traffic that flows in the second direction; and upon detecting that the AV is able to turn through the intersection across the second lane of the first roadway and into the second roadway without impeding the second traffic that flows in the second direction, controlling at least one of a propulsion system or a steering system to cause the AV to turn through the intersection across the second lane of the first roadway and into the second roadway.

16. The AV of claim 15, wherein the intersection is free of an intersection painted lane boundary between the painted lane boundary and another painted lane boundary in the second roadway.

17. The AV of claim 15, the acts further comprising:
prior to reaching the stop line and while travelling in the first direction in the first roadway, controlling at least one of the propulsion system, the steering system, or a braking system to adhere to the painted lane boundary.

18. The AV of claim 15, wherein detecting that the AV is able to turn through the intersection across the second lane of the first roadway and into the second roadway without impeding the second traffic that flows in the second direction comprises:
detecting that the traffic light has transitioned from green to red.

19. The AV of claim 15, wherein the previously computed lane boundary is computed based upon at least one of a width of the intersection, a length of the intersection, or a turn radius of the AV.

20. The AV of claim 15, wherein the sensors comprise a lidar sensor and a camera.

* * * * *